United States Patent [19]

Dews et al.

[11] Patent Number: 4,942,764

[45] Date of Patent: Jul. 24, 1990

[54] MOUNTING HEAD FOR A RESISTANCE-TAPE LEVEL SENSOR

[75] Inventors: Edwin P. Dews, Hampton Falls, N.H.; William E. Pierce, Winchendon, Mass.; John A. Gunnarson, Concord, Mass.; Albert D. Ehrenfried, Maynard, Mass.

[73] Assignee: Metritape, Inc., Littleton, Mass.

[21] Appl. No.: 325,139

[22] Filed: Mar. 17, 1989

[51] Int. Cl.⁵ .................. G01F 23/00; H02G 15/22
[52] U.S. Cl. .......................... 73/301; 73/292; 174/19; 174/65 SS; 174/77 R
[58] Field of Search ............... 174/77 R, 19, 65 SS; 277/110, 112; 73/301, 292

[56] References Cited

U.S. PATENT DOCUMENTS

| | | | |
|---|---|---|---|
| 2,333,847 | 11/1943 | Deely | 277/112 |
| 2,750,436 | 6/1956 | Richter | 174/77 R |
| 3,011,808 | 12/1961 | Tucker et al. | 277/112 |
| 3,511,090 | 3/1970 | Ehrenfried et al. | 73/301 |
| 3,583,221 | 6/1971 | Ehrenfried et al. | 73/301 |
| 3,655,907 | 4/1972 | Philibert et al. | 174/77 R |
| 3,697,089 | 10/1972 | Jacisin et al. | 174/65 SS X |
| 3,792,407 | 2/1974 | Ehrenfried et al. | 338/13 |
| 4,013,423 | 3/1977 | Evens | 277/112 X |
| 4,267,401 | 5/1981 | Wilkinson | 174/77 R |
| 4,358,956 | 11/1982 | Ruben et al. | 73/301 |
| 4,373,388 | 2/1983 | Kitamura et al. | 73/301 |
| 4,717,159 | 1/1988 | Alston et al. | 277/110 X |

*Primary Examiner*—Morris H. Nimmo
*Attorney, Agent, or Firm*—Weingarten, Schurgin, Gagnebin & Hayes

[57] ABSTRACT

A mounting head for a resistance tape level sensor is provided which includes a cylindrical outer shell enclosing deformable elastomeric elements surrounding and supporting certain elements of the sensor and clamped to provide high internal compressive forces for sealing all leakage paths.

14 Claims, 4 Drawing Sheets

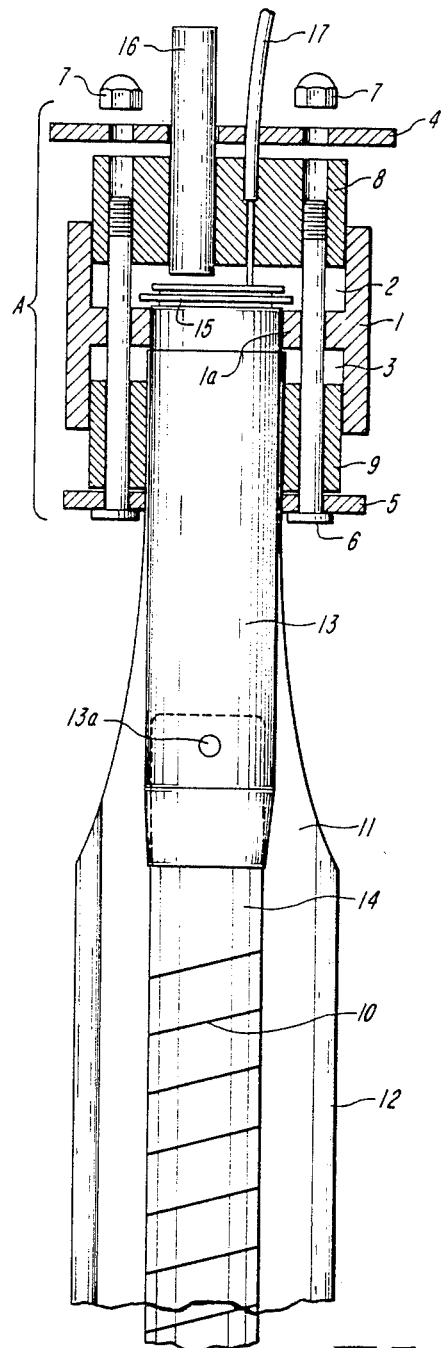
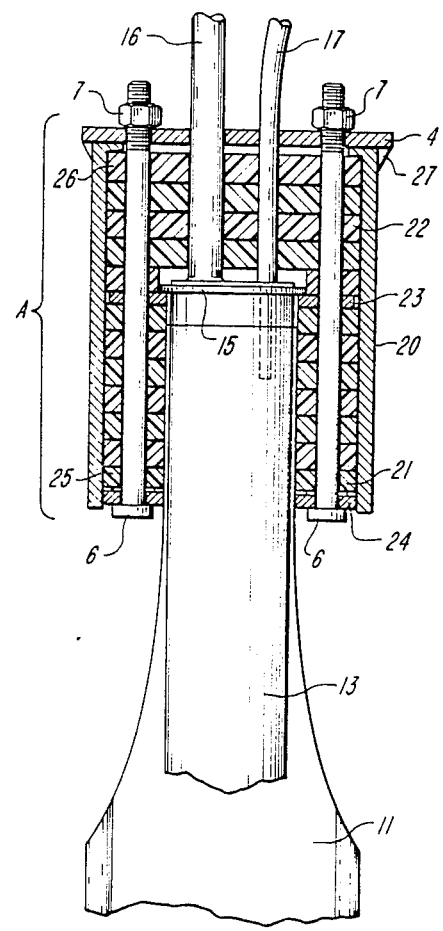
FIG. 1
FIG. 2

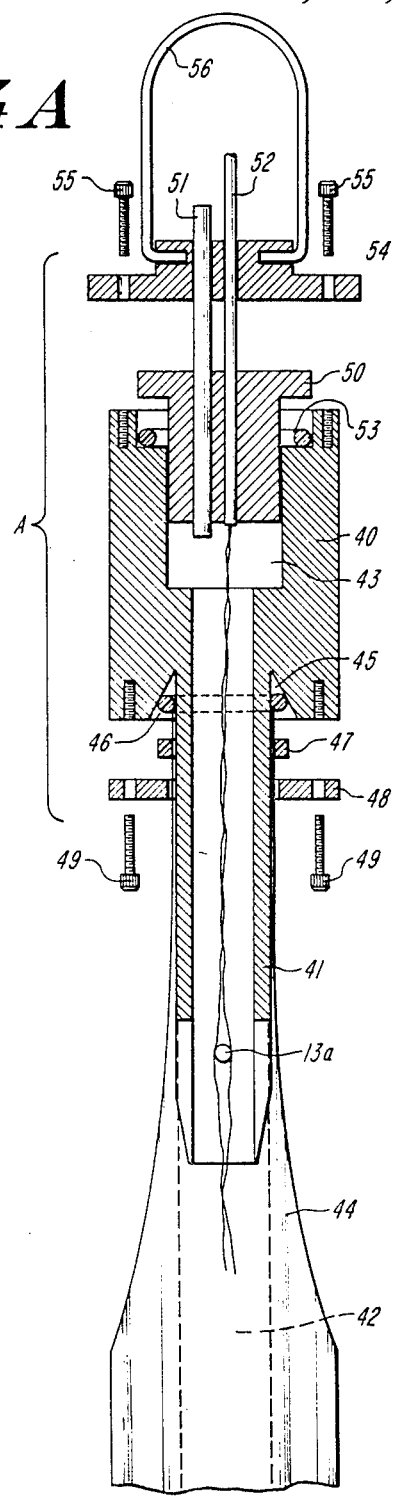
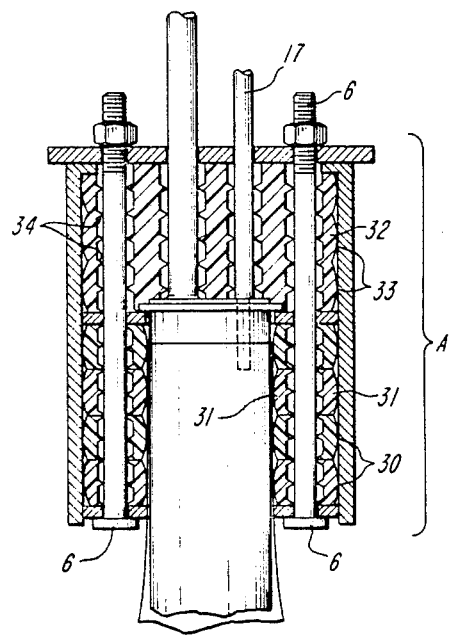
FIG. 4A
FIG. 3

MOUNTING HEAD FOR A RESISTANCE-TAPE LEVEL SENSOR

FIELD OF THE INVENTION

This invention relates to material level sensors, and more particularly to resistive fluent material level sensors.

BACKGROUND OF THE INVENTION

This invention relates to a unique sensing device, based upon the resistance-tape principle, which is known commercially and described in the literature under the trademark "Metritape" sensor, and which is the subject of several U.S. Patents, including U.S. Pat. Nos. 3,511,090; 3,583,221; and 3,792,407.

The Metritape sensor comprises an elongated metallic base strip having electrical insulation on the edges and back of the strip to define an uninsulated zone along the length of the base strip,, and a resistance wire or ribbon helically wound around the insulated base strip, with the helical turns bridging the insulated edge portions being spaced from the underlying uninsulated zone of the base strip. This sensor structure is enclosed within a continuous polymeric or other protective sleeve to provide a clean and dry inner chamber for the sensor. The sensor is disposed within a tank or vessel containing the liquid or fluent material, the level of which is to be monitored. The pressure of the material surrounding the immersed sensor causes the deflection of the enclosing sleeve and helical turns in the immersed portion of the sensor into engagement and electrical contact with the underlying base strip, such that an electrical resistance proportional to material level is provided.

Applications for this elongated resistance-tape sensor have ranged from the gauging of short land-based tanks to deep oil and ballast tanks of ocean-going supertankers; from tanks open to atmosphere, to closed heavy-walled tanks containing several atmospheres of pressure; from tanks never filled above 98% of level, to tanks that are frequently overfilled to a height that imparts an overpressure upon tank and sensor components; from tanks containing water and benign liquids to those holding corrosive chemicals and aggressive solvents; also including applications in which the top head of the resistance-tape sensor may be inadvertently or intentionally submerged below the surface of the liquid being gauged.

Within this application range, it is the role of the sensor head to contain and terminate the materials that comprise the sensor upper end, to mechanically support the sensor in its suspended location, to exclude the entry of vapors and liquids from below or above into the inner sensor chamber, to provide means by which pressure within the sensor chamber is equalized to surrounding pressure in the tank, and also to provide means for bringing resistance element and electronic circuits within the sensor out to external connections without providing leakage paths for liquid or vapor entry.

Several techniques have been employed to provide such a multi-purpose top termination for the resistance-tape sensor. In one configuration the sensor top end is enclosed within a metallic tube that may be flared for supporting sensor weight against a threaded nipPle. Elements of the sensor are brought into the underside of the tube, and a breather tube and leadwires are brought through a top plate, or header, out of the top of the enclosing tube. At final assembly, the enclosing tube is inverted and, with parts properly positioned as they enter and leave the tubular structure, an encapsulant such as rigid epoxy is poured into the inverted tube and allowed to harden so as to form a rigid end sealing structure.

Depending upon application circumstances, such an encapsulated head may develop leakage paths due to a number of causes. Adhesion of components to the epoxy may be initially established, but mechanical shock or temperature cycling may cause the parts to shift relative to one another sufficient to develop small leakage paths or planes. In addition, as the epoxy sets up, it is exothermic and causes a rise in temperature of the components being encapsulated. As the epoxy sets and the temperatures diminish, there may be a shrinkage of parts which can cause microscopic leakage paths to open up. Furthermore, if leaks do appear after the setting of the epoxy, it is difficult to locate and seal them reliably, or to recover the sensor components for re-making the encapsulated head seal.

A second approach to sensor top-end termination is to provide a tubular structure at the top to which the outer sheath or boot of a sensor is engaged; and a mechanical clamping structure, such as of polytetsafluoroethylene for chemical corrosion resistance, is used to enclose the top end of the boot and to compress it firmly against the upper tubular structure. Such mechanical clamping has the advantage that it can be tightened if small leakage paths appear. But it has been found that the irregular shape of the jacket boot, particularly as it is folded to pass under the clamp, is such that small leakage paths may occur and require the use of a sealing compound to block and seal the boot irregularities. Elevated temperatures or solvent action may also cause such compound to migrate, leaving small leakage paths into the sensor head and inner sensor chamber.

The subject invention represents a means for achieving reliable sealing of the top sensor head, and in a manner that is versatile and allows accommodation of the wide range of conditions under which resistance-tape sensors are used.

Accordingly, it is an object of this invention to develop positive compressive forces for engaging and holding tightly together the components that comprise the top end termination.

Another object is to provide means for making the compressive forces adjustable and for allowing increase in compressive force to meet application conditions such as wide swings in operating temperature.

A further object is to provide a sensor top head termination that mechanically clamps the lower sensor elements so as to reliably support their weight and to resist pull down forces which may be imparted by turbulence or by solids present in slurries or liquids being gauged.

Another object is to provide a sensor top head which clamps and seals adequately against the breather tube and the electric leadwires emerging from the top end of the sensor.

Another object is to provide a sensor top head of modular design so that materials of construction can be changed or varied within the head to accommodate the gauged materials and operating conditions, and also to allow reduction in the component cost of the head structure.

Another object is to provide a head which allows the attachment of a lifting handle at the top of the sensor and a close-fitting channel to engage and protect the lower sensor along its length.

A further object is to provide a top head structure of such envelope dimensions that it can be used within, and retrofitted into, existing sensor mounting arrangements.

Another object of this invention is to provide a sensor head which can be conveniently disassembled and remade if a flaw should be discovered during the manufacturing process.

A further object is to provide a top head structure which can be later disassembled after a period of use, certain components cleaned, replaced or upgraded, and the sensor reassembled and returned to service.

Another object is to provide a sensor top head which may be composed of metallic or polymeric materials, or of coated elements or composite materials, so as to allow optimization of performance at economical cost.

SUMMARY OF THE INVENTION

In brief, the present invention utilizes a cylindrical outer shell to enclose deformable elastomeric material which is relieved at the bottom center to receive a rigid tube that supports the length of resistance-t-ape sensor and is surrounded by the open end of the outer sensor boot, and relieved at the top to receive sensor breather tube and electric leadwires. Rigid end plates are used at top and bottom of the outer shell to contain the inner elastomeric material, and bolts, clamps or other means are used to draw the end plates together to generate high internal compressive forces.

Such contained compressive forces cause the deformable elastomeric components to flow into and seal crevices and leakage paths and to clamp sensor top elements together to form an integral mechanical end termination. Dependence upon encapsulants and their setting times is reduced, and compressive sealing forces are made sufficiently great to overcome dimensional shifts and sealing failures that might otherwise be caused by temperature cycling or mechanical shock and vibration.

DESCRIPTION OF THE DRAWINGS

The invention will be more fully understood from the following detailed description taken in conjunction with the accompanying drawings, in which:

FIG. 1 is a cutaway exploded view showing one embodiment of the resistance-tape sensor head of this invention, having large elastomeric inserts captured within a dual-chamber cavity housing;

FIG. 2 is a cutaway view of another embodiment in which laminar elastomeric inserts are captured within an outer shell;

FIG. 3 is a cutaway view showing a variation on the embodiment of FIG. 2, with both large and laminar configurations of elastomeric inserts having surfaces shaped to provide regions of line or zonal contact;

FIGS. 4A and 4B are, respectively, a cutaway exploded view and cutaway pictorial view of another embodiment of the sensor head of this invention;

DETAILED DESCRIPTION OF THE INVENTION

The resistance-tape material level sensor with which the invention is employed is sold commercially and is known as a "Metritape" sensor, a top end termination of which is shown in FIG. 1 to embody the concepts of this invention. Referring to FIG. 1, there is shown an outer body 1, cylindrical in section and shaped to provide upper and lower cavities 2 and 3, separated by a wall 1a, and having cross section of sufficient strength to contain compressive forces developed in sealing the top or head end.

Figure 7:
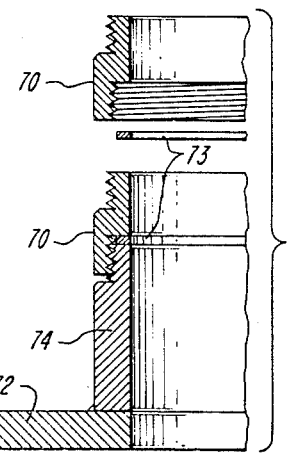
FIG. 7 is an exploded cross-sectional view of an adjustable height nipple to which the sensor head of the invention may be engaged.

Body 1 is engaged at top and bottom with flat plates 4 and 5 which are held in place by longitudinal fasteners such as bolts 6, secured by nuts 7 Top terminating plate 4 extends beyond the diameter of body 1 so as to form a flange for secure clamping and sealing of the described head in its operating location, such as to the adjustable nipple of FIG. 7.

Within cavities 2 and 3, closed by the end pieces described, are deformable elements 8 and 9, comprised of elastomeric or similar material, and perforated to allow various mechanical and electrical elements to enter the internal regions of the sensor head A from top and bottom directions. The deformable elements 8 and 9, as well as the deformable elements of the embodiments to be later described, are comprised of a deformable elastomeric material which is substantially incompressible. The material is of such characteristics as to deform in shape without compression of reduction in volume in the presence of applied force, thereby to be deformed into sealing engagement with the cooperative elements of the mounting head. The deformable elastomeric material typically can be copolymer of vinylidene fluoride and hexafluoropropylene Neoprene or Buna-N.

Below the sensor head A shown in FIG. 1 is the top termination of the resistance-tape sensor comprising a resistance element 10 helically wound around a steel base strip 14, and which may have an enclosing boot 11 and protective edge pieces 12 such as is taught in U.S. Pat. No. 4,816,799. The base strip 14 of this sensor has an end perforation which is secured to a cylindrical tongue 13 such as with a non-conductive mechanical pin 13a.

The tongue 13 enters the described sensor head A through a close fitting cylindrical opening in the bottom. The boot 11 which envelopes the entire lower element of the resistance-tape sensor is cut back and shaped to surround the tongue and accompany it into the sensor head A where it is itself surrounded by elastomeric insert piece 9. The tongue 13 is mechanically secured to body 1 by means of snap ring 15 which, once engaged, rests on wall 1a and prevents the tongue from disengaging from the sensor head A.

At the top of head, terminating plate 4 and deformable insert 8 are shaped to allow a breather tube 16 and a number of wires 17, which may typically range from 2 to 8 or more in number, to enter the internal head chamber from the top. Engagement of all such elements are generally snug fitting to promote effective sealing of the head against penetration of unwanted liquids and vapors. The breather tube 16 communicates with the interior of the sensor and prevents pressure differentials between the sensor interior and exterior which can affect the operation of the resistance-tape sensor. The leadwires 17 provide electrical connection to the level sensor which may be supplemented with one or more temperature sensors mounted along the length of the tape. The sensor structure itself is not part of this invention and is described in more detail in the above-identified patents of the assignee herein.

When the sensor head A of FIG. 1 is assembled and draw bolts 6 and nuts 7 engaged and tightened, elastomeric inserts 8 and 9, captured within their respective compartments 2 and 3, are deformed so as to provide increasingly tight engagement with both internal and external adjoining elements and surfaces. Such inserts 8 and 9 are regarded as essentially incompressible liquids, and the pressures of engagement and resultant sealing forces are related directly to the longitudinal tensions imparted by draw bolts 6, which may be two, four or greater in number, placed around the circumference of the sensor head A. To be discussed are special provisions which may be used to seal shaped boot 11 at its entry into the sensor head A, and also to seal wires 17 which are commonly stranded.

Referring next to FIG. 2, the shaped body of the sensor head A in previous FIG. 1 has been replaced by a shell 20 having sufficient wall thickness to support internal expansion forces. In addition, the deformable elements have been replaced by laminar inserts or wafers, which may be formed economically by punching, as opposed to molding. The wafers 21 at the bottom of the head are shaped to receive tongue 13 and its surrounding boot 11, plus the draw bolts 6 as in the previous illustration.

The deformable wafers 22 at the top of the head are shaped to allow entry of breather tube 16 and a multiplicity of leadwires 17, in addition to the draw bolts 6 which emerge to engage nuts 7, which fasteners may be two or greater in number.

Within the stack of deformable wafers shown in this embodiment of the subject invention is a rigid floating annular washer 23 which is held fixed within the compressed stack and serves to engage snap ring 15 which, as before, retains the cylindrical tongue 13 firmly secured within the sensor head A.

Also shown in FIG. 2 is oversized top plate 4, such as in FIG. 1, and a rigid annular plate 24 which fits closely within the annular space formed by outer shell 20 and tongue and boot 13 and 11, respectively. As draw bolts 6 are engaged and tightened, the rigid annular plate 24, typically of Teflon, is drawn up into its space a sufficient distance to compress the stack of deformable wafers and cause them to engage tightly against both internal and external surfaces by which they are captured.

Because the sensor head A of this invention may be exposed to corrosive liquids and vapors, the metals and elastomers thereof are selected to be resistant to chemical attack, and metals may be coated with protective polymers to improve their chemical resistance. The wafers can be of different materials. For example, the outermost wafers such as wafers 21 and 26 shown at the top and bottom can be of more chemically resistant material, which is usually more costly, and can serve to guard the inner wafers 22 which can be of less costly material. Preferably the wafers are of substantially equal durometer to provide equal deformation over the entire stack of wafers.

As added protection from chemical attack by tank liquid or vapor, a thin annular spacer 25 is shown at the bottom of the sensor head of FIG. 2. This may be of material such as Teflon which has very high resistance to chemical attack and can serve at top and bottom to guard adjacent elastomeric wafers against liquids or fumes to which they may be exposed.

Likewise, to form a seal at the top mounting surface of the head, a wedge ring 27, also of an elastomeric material such as Teflon or Neoprene, is shown and is shaped to engage the top rim of a mounting nipple to which the sensor head A of this invention is secured, as shown in FIG. 7. Such wedge ring 27 prevents corrosive liquids and fumes from escaping from the tank in which they are contained, and also provides for containment of modest pressures such as may be imposed by an inert-gas atmosphere within the storage vessel.

Referring next to FIG. 3, there is shown therein a sensor head A having elements common to FIGS. 1 and 2, but with deformable elastomeric elements here shown in different geometrical configurations. In the earlier figures, the elastomeric components engaged along large surface areas, requiring high compressive forces in order to develop high sealing forces in terms of force per unit surface area. The forces of engagement along potential leakage paths can be increased, however, by reducing the surface areas of engagement and applying the engagement pressures over restricted lines or zones of surface contact.

In the lower portion of the sensor head A of FIG. 3 a stack of shaped wafers 30 are shown, these having a barrel-shaped cross section which provides a series of contact regions of engagement 31 with both inner and outer mating surfaces. By means of successive wafers, a labyrinthine seal is formed to prevent the penetration of liquids or vapors from outside inward. Such wafer configuration takes benefit of the advantages that have been demonstrated over the years by 0-ring seals, as they are commonly used.

At the upper region of the sensor head A of FIG. 3, a single deformable insert 32 is shown molded to provide multiple regions of relatively high pressure engagement. For example, the outer surface of this insert piece also forms a series of contact zones 33 which form a labyrinthine seal against penetration from the sensor top.

Within the insert piece 32, the openings that receive draw bolts 6 are given a multiplicity of shaped ridges 34 which mate intimately with bolt outer diameters and again form a labyrinthine seal to prevent entry of liquids and vapors. Similar engagement is also shown between elastomeric insert and the outer insulation of typical leadwire 17. This figure illustrates that a number of shapes and configurations of elastomeric parts are possible and that all are subject to deformation and to the delivery of lateral sealing forces when driven by longitudinal forces such as generated by draw bolts 6 being progressively tightened.

Figure 4B:
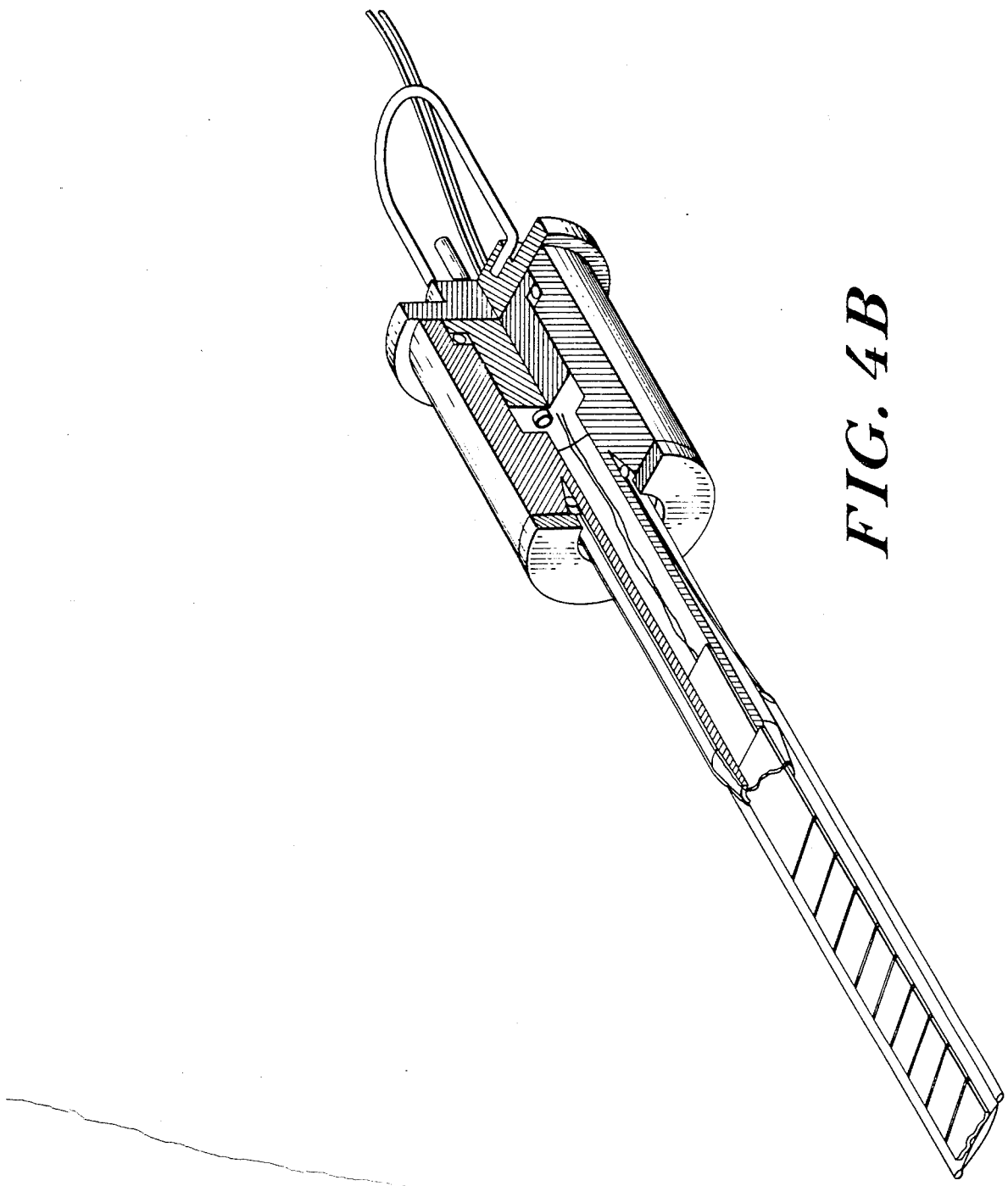

Another configuration of the subject invention is depicted by the sensor head A shown in the exploded cutaway view of FIG. 4A and in pictorial view in FIG. 4B. Here, a structural body 40 is shown rigidly attached to a cylindrical tongue 41 which has a hollow axial opening to provide an internal passageway from resistance-tape sensor 42 mounted below and internal head cavity 43. At the bottom of the illustrated sensor head A, enclosing boot 44 enters along the cylindrical outer surface of tongue 41 into a lower cylindrical cavity having a conical surface 45. Interposed between boot 44 and conical surface 45 is sealing 0-ring 46, which is acted upon by cylindrical push ring 47.

These elements are further engaged by a bottom plate 48 which is secured in position against the bottom of body 40 by two or more screws 49. The described elements are so sized and positioned that the tightening of screws 49 drives bottom plate 48 against the bottom surface of body 40, and causes push ring 47 to drive 0-ring 46 down taper 45, resulting in a tight and sealing engagement against sensor boot 44. Additional details of such sealing are later illustrated and described.

At the top of the sensor head A, of FIG. 4 is shown an integral assembly 50 which holds a breather tube 51 and a multiplicity of electric leadwires 52, such as can be formed by the encapsulation of these entering parts. This feed-through assembly 50 engages body 40 through a sealing 0-ring 53 and is held in placed by a flanged hold-down header 54 which is, in turn, secured in place by a number of screws 55.

The bottom portion of header 54 extends beyond the diameter of body 40 so as to form an outer lip or flange, which acts as a mounting and sealing surface for the sensor head A of this illustration, and may work in conjunction with an elastomeric wedge-ring or 0-ring to seal against the top rim of a mounting nipple, such as shown in FIG. 7. Flanged header 54 also provides means for engaging a lifting handle such as 56 by which the entire resistance-tape sensor is lowered into place or lifted for removal. The full engagement of screws 55 can be seen to bolt the described elements in their functional positions, and to depress feed-through assembly 50 against 0-ring 53 to prevent liquids and vapors from entering sensor head inner space 43 from above this structure, thereby making the subject sensor head submersible.

The head can be readily assembled, and also readily disassembled for repair and/or replacement. The general sequence for mechanical assembly of the sensor head is as follows. The top of the head A is first assembled, with leadwires 52 being lead from the underside of the potted assembly 50 down through head body 40 and the central opening of tongue 41. Bottom sealing components (0-ring 46, push ring 47 and bottom plate 48, if of continuous annular design instead of split design, are threaded in proper sequence onto tongue 41 to complete head subassembly.

The head and prepared end of base strip 42 are then aligned and joined with insulating pin 13a. Boot end 44, which has been cut to tapered shape and sized (if necessary), is brought to the bottom of head bodY 40, and bottom sealing components transferred onto boot end 44. The boot end is then pushed fully into the underside of head body 40, 0-ring 46 and push ring 47 are pressed into tapered cavity 45, and bottom plate 48 tightly secured. Handle 56 is then installed, along with breather-tube and wiring terminations as sensor configuration dictates.

Figure 5A:
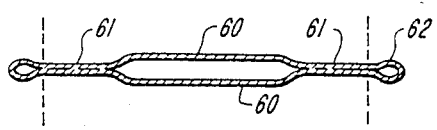
FIGS. 5A through 5B are end views of a segmented the resistance tape sensor boot illustrating the termination thereof for use in the mounting head of the invention.
Figure 5B:
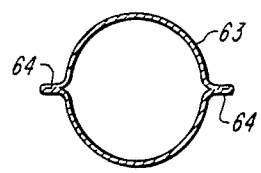
Figure 5C:
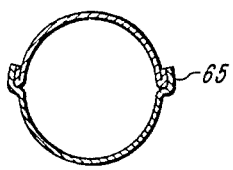
Figure 5D:
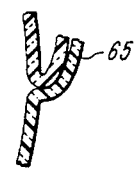

FIG. 5A–5D show important details of the sensor as embodied in this invention. In FIG. 5A there is shown the cross section of an extruded boot such as may totally enclose the elongated element of a resistance tape sensor. It can be seen that top and bottom film surfaces 60 are sealed at two edges 61 and are thereafter formed, in this instance, into outer beads which provide mechanical protection to the sensitive surfaces 60 of the element. To prepare the boot of FIG. 5A for sealing in the sensor head of this invention, the outer beads 62 are severed at the dashed cut lines shown, to form a cross-section (when rounded) such as 63 of FIG. 5B.

The small protruding ears 64 require special consideration in the forming of a tight seal within the subject sensor head. These ears may be left protruding as in FIG. 5B, or they may be folded over as shown at 65 in FIG. 5C, and in FIG. 5D which is enlarged to illustrate how the sealed conjunction of the two films may be folded over. The small creases and seams formed by folding over the ears as at 65 must be sufficiently compressed so as to close any leakage passages that may be developed.

For boot films that are thin and pliable, the gaps formed by folding over ears as at 65 can usually be sealed effectively by the compressive forces developed by the head configurations or prior illustrations. However, for thicker boot sections, the use of a viscous sealant compound may aid in the blockage of leakage paths and crevices, but may suffer the disadvantage of being attacked by the solvent action of solvents, chemicals and crude oils that may be gauged.

Figure 6A:
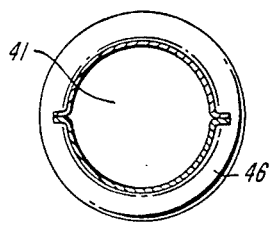
FIGS. 6A through 6C are cross-sectional views of 0-ring seals for use with the resistance-tape sensor boot in the embodiment of FIG. 4.
Figure 6B:
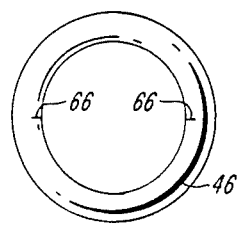
Figure 6C:
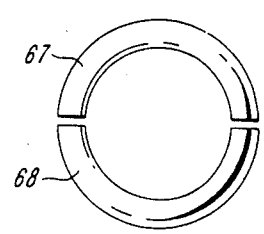

In one embodiment of this invention, it is preferred that the ears 64 project straight outward and, in the head of FIG. 4, that the lower 0-ring 46 be provided with notches 66, as in FIG. 6B, in such manner as to receive ears 64 as illustrated in FIG. 6A. In another configuration, shown in FIG. 6C, the 0-ring 46 may be provided in two independent halves 67 and 68, again to allow capture of the boot ears 64 as they enter the underside of the sensor head A of FIG. 4.

The split segment construction can also be extended to one or more of the other bottom closure components. By splitting push ring 47 and/or bottom plate 48 into approximate halves, these can be assembled and removed without disassembly of base strip 42 from tongue 41. This split construction generally requires four or more fastening screws 49, and the rounding of segment edges to prevent cutting into underlying boot material.

Shaping of the end of boot 44 must be carefully performed, and a tool may be devised that is clamped to the end of the boot and provides shaped edges to guide cutting of the boot end to a specific contour. Such a guide insures that boot ends are cut in consistent manner that does not narrow the width of the critical boot edge seams. Also, by clamping the edge seams, this tool allows the boot faces to be stretched, when the boot is too tight to fit over the cylindrical tongue 41, without imparting excessive stress upon the boot edge seams.

Additional sealing provisions may be required to prevent leakage of liquids and vapors through leadwires, particularly if they are stranded and subjected to tank or submersion pressures. The principles of such sealing are well known in the art and are not claimed as a part of this invention. In summary, the practice involves the baring of leadwire ends and the making of splices that are liberally infused with solder, and the splices then embedded in a matrix of epoxy, or other encapsulant, as in the part 50 of FIG. 4.

The resistance-tape sensor is suspended in a tank or other measuring site by engaging a threaded nipple at the top of the tank. The head is disposed in the nipple with the over-sized plate 54 of FIG. 4 resting on the top edge of the nipple. It is often desirable to adjust the height of the sensor in the tank so that the sensor reaches close to the tank bottom, but does not interfere with the tank bottom which could cause excessive wear at the bottom of the sensing element.

One means for accomplishing such objective is to provide the upper mounting nipple as a series of threaded rings 70 shown in FIG. 7, which can be progressively engaged to one another. The resistance-tape sensor can thus be lifted in its mounting position by the addition of one or more such rings to the nipple 71 fixed to the bottom of housing 72.

If the sensor, however, is elevated too far above the tank bottom, one or more such rings may be removed, providing a lower mounting surface for engagement of the sensor head of this invention. Since the tank may contain gas pressure, it may be desirable to insert gaskets 73 between mating surfaces of successive threaded rings.

It can thus be seen from this invention, as described and illustrated, that a number of sensor head configurations involving components of differing shapes and composition can be combined to form a sensor head within the scope of this invention, and that such combinations and variations may appear at both the bottom and the top of the sensor head and that these may be chosen to suit the operating environments experienced. Sensor heads may also be tailored through the use of machined metal or molded plastic or composition parts to satisfy the requirements of function and economy of the particular applications being served.

Other configurations incorporating similar principles and practices are deemed to fall within the spirit of this invention. Moreover, the invention is equally applicable to Metritape and other strip type sensors that may be used for other than level sensing, such as for position sensing, and also for gauging other than fluent liquids, and for temperature sensing. Accordingly the invention is not to be limited except as indicated in the appended claims.

We claim:

1. A mounting head for a resistance tape sensor comprising:
   a cylindrical body of rigid material having an upper cavity portion and a lower cavity portion;
   a cylindrical tongue of rigid material coaxially disposed in the lower portion of the body and operative to retain a resistance-tape sensor;
   a first deformable elastomeric element disposed in the upper cavity portion;
   electrical coupling means disposed through the first deformable elastomeric element and connectable to the sensor to be installed through the cylindrical tongue;
   gas coupling means disposed through the firs deformable elastomeric element and coupleable to the interior of the sensor to be installed within the cylindrical tongue;
   a second deformable elastomeric element disposed in the lower cavity portion and surrounding and in engagement with the tongue;
   a top plate disposed over an end surface of the first deformable elastomeric element;
   a bottom plate disposed around the tongue and an end surface of the second deformable elastomeric element; and
   fastening means for drawing the top plate and bottom plate together to cause deformation of the first and second deformable elastomeric elements to seal all leakage paths into the mounting head.

2. A mounting head for a resistance-tape sensor comprising:
   a cylindrical body of rigid material having an upper cavity and a lower cavity separated by a transverse partition having an opening therethrough communicating with the upper and lower cavities;
   a cylindrical tongue of rigid material coaxially disposed in the body and disposable in the opening in the transverse partition, and operative to retain the resistance-tape sensor;
   means for retaining the tongue in the body;
   a first deformable elastomeric element disposed in the upper cavity;
   a second deformable elastomeric element disposed in the lower cavity and surrounding and in engagement with the confronting surface of the tongue;
   a top plate disposed over the end surface of the first deformable elastomeric element;
   a bottom plate disposed around the tongue and on the end surface of the second deformable elastomeric element;
   fastening means for drawing the top plate and bottom plate toward each other to cause deformation of the first and second deformable elastomeric elements to seal all leakage paths into the mounting head.

3. The invention of claim 2 wherein at least one of said first and second deformable elastomeric elements are contoured on outer contact surfaces to form a succession of ridges that concentrate contact pressures and create a labyrinth that resists the passage of liquid or vapor into the inner sensor chamber.

4. The invention of claim 2 wherein at least one of said first and second deformable elastomeric elements are comprised of laminar wafers that may be contoured on outer and inner surfaces to concentrate sealing pressures and form a labyrinth of seals that resist leakage of liquid or vapor, with the materials of construction of successive wafers selected to resist chemical attack.

5. The invention of claim 2 wherein each of the first and second deformable elastomeric elements is a single block of deformable elastomeric material.

6. The invention of claim 2 wherein the mounting means for the tongue is operative to mount the tongue on the transverse partition of the body.

7. The invention of claim 2 wherein the top plate extends beyond the diameter of the body to form a flange for clamping and sealing of the head to a mounting structure.

8. The invention of claim 2 wherein the fastening means include a plurality of bolts extending through openings in the bottom plate, first and second elements and top plate, and nuts cooperative with the bolts for drawing the top and bottom plates together to provide the intended deformation and sealing of passages in the first and second elements.

9. A mounting head for a resistance-tape sensor comprising:
   a cylindrical housing of rigid material;
   a plurality of deformable elastomeric wafers stacked within the housing;
   the wafers at the bottom portion of the housing having an opening therein shaped to receive the tongue and surrounding boot of a resistance-tape sensor;
   the wafers at the upper portion of the housing having openings aligned therethrough and shaped to receive a breather tube and leadwires of a sensor to be installed;
   an annular rigid washer disposed within the stack of wafers at a position near the top of the aligned opening in the bottom portion of the housing, the rigid annular washer being cooperative with retaining means on the tongue to secure the tongue within the housing;

a top plate disposed on the top end of the housing;

a bottom plate disposed within the lower end of the housing;

fastening means for drawing the bottom plate toward the top plate to deform the wafers within the housing and provide compressive sealing forces around elements entering the inner chamber of the housing.

10. A sensor mounting head in combination with an elongated tape-like sensor disposable within a vessel containing a fluent material the level of which is to be monitored, and operative in response to the pressure of materials surrounding the immersed sensor to provide an electrical resistance proportional to material level, comprising:

a rigid tube supporting a confronting end of an elongated tape-like sensor;

electrical coupling means in the rigid tube electrically connected to the sensor;

gas coupling means in the rigid tube and in fluid coupling with the interior of the sensor;

a deformable elastomeric material surrounding a portion of the rigid tube;

an outer shell enclosing at least partially the deformable elastomeric material;

retaining means at respective ends of the outer shell and operative to contain the elastomeric material and to generate high internal compressive forces on the rigid tube;

the electrical coupling means and gas coupling means having portions extending from the interior of the rigid tube to a position external of the head.

11. A mounting head for a resistance-tape sensor comprising:

a cylindrical body of rigid material having an upper cavity portion, a lower cavity portion and an outwardly flared portion;

a cylindrical tongue of rigid material coaxially disposed in the lower portion of the body and operative to retain a resistance-tape sensor;

a first deformable elastomeric element disposed in the upper chamber portion;

electrical coupling means disposed through the first deformable elastomeric element and connectable to the sensor to be installed through the cylindrical tongue;

gas coupling means disposed through the first deformable elastomeric element and coupleable to the interior of the sensor to be installed within the cylindrical tongue;

a second deformable elastomeric element disposed in the flared portion and surrounding in engagement with the tongue;

a rigid ring element disposed in the flared portion and confronting the second deformable elastomeric element;

a top plate disposed over an end surface of the first deformable elastomeric element;

a bottom plate disposed around the tongue and an end surface of the rigid ring element; and fastening means for drawing the top plate and bottom plate together to cause deformation of the first and second deformable elastomeric elements to seal all leakage paths into the mounting head.

12. The invention of claim 11 wherein the second deformable elastomeric element is an O-ring disposed in the flared portion of the body.

13. The invention of claim 12 further including an O-ring disposed between a portion of the first deformable elastomeric element and a confronting portion of the body.

14. The invention of claim 12 wherein the fastening means are threaded fasteners threadable into cooperative openings in the body.

* * * * *

UNITED STATES PATENT AND TRADEMARK OFFICE
CERTIFICATE OF CORRECTION

PATENT NO. : 4,942,764

DATED : July 24, 1990

INVENTOR(S) : Edwin P. Dews, et al.

It is certified that error appears in the above-identified patent and that said Letters Patent is hereby corrected as shown below:

Column 1, line 65, "niPle" should read --nipple--.
Column 2, line 26, "polytetsafluoro-" should read --polytetrafluoro- --.
Column 3, line 25 "resistance tape" should read --resistance-tape--.
Column 3, line 62, "5A through 5B" should read --5A through 5C--.
Column 4, line 19, "nuts 7 Top" should read --nuts 7. Top--.
Column 4, line 38, "can be copolymer" should read --can be a copolymer--.
Column 7, line 39, "The top of the head A" should read --The top of the head is--.
Column 7, line 38, "sensor head is as" should read --sensor head A is as--.
Column 7, line 49, "bodY" should read --body--.

Signed and Sealed this

Twenty-fourth Day of November, 1992

Attest:

DOUGLAS B. COMER

Attesting Officer

Acting Commissioner of Patents and Trademarks